United States Patent [19]

Lammers et al.

[11] Patent Number: 5,175,065
[45] Date of Patent: Dec. 29, 1992

[54] PLATED SPRING ELECTROLYTE DISPENSING AMPULE FOR DEFERRED ACTION BATTERIES

[75] Inventors: Richard H. Lammers; John R. Welling, both of Scottsdale, Ariz.

[73] Assignee: Motorola Inc., Schaumburg, Ill.

[21] Appl. No.: 392,491

[22] Filed: Jun. 28, 1982

[51] Int. Cl.⁵ .............................................. H01M 6/36
[52] U.S. Cl. .................................. 427/114; 427/116; 102/207
[58] Field of Search ...................... 429/113, 114, 116; 102/207; 206/601, 602, 634

[56] References Cited

U.S. PATENT DOCUMENTS

| | | | |
|---|---|---|---|
| 2,927,145 | 3/1960 | Burrell | 429/114 |
| 2,981,778 | 4/1961 | Freund | 429/114 |
| 3,376,166 | 4/1968 | Hruden | 429/116 |
| 3,607,401 | 9/1971 | Halpert et al. | 429/116 |
| 3,653,972 | 4/1972 | Bolles | 429/116 |
| 3,663,302 | 5/1972 | Kaye | 429/116 |
| 3,669,753 | 6/1972 | Kaye | 429/116 |
| 3,718,508 | 2/1973 | Levine | 429/114 |
| 3,754,996 | 8/1973 | Snyder | 429/114 |
| 3,945,845 | 3/1976 | Morganstein | 429/114 |

FOREIGN PATENT DOCUMENTS 2638645 10/1977 Fed. Rep. of Germany ...... 429/114

Primary Examiner—Peter A. Nelson
Attorney, Agent, or Firm—Maurice J. Jones; Frank J. Bogacz; Eugene A. Parsons

[57] ABSTRACT

An electrolyte dispensing ampule for deferred action batteries comprises a spring having means at both ends thereof for forming a closed, generally cylindrical space inside the spring and a metal layer covering the spring to hermetically seal the space. An electrolyte solution is contained in the spring and is dispersed to activate the battery when set-back forces extend the spring and break the sealing layer.

7 Claims, 1 Drawing Sheet

PLATED SPRING ELECTROLYTE DISPENSING AMPULE FOR DEFERRED ACTION BATTERIES

FIELD OF THE INVENTION

The present invention relates, in general, to deferred action batteries for use in projectile fuzes and the like. More particularly, the present invention relates to a plated spring electrolyte dispensing ampule which provides hermetic sealing for the electrolyte solution until experiencing set-back forces and which does not require complex and expensive damped, acceleration driven cutter assemblies for reliable electrolyte release.

BACKGROUND OF THE INVENTION

The unique power requirements of projectile fuzes and the like instigated the development of deferred action batteries. Such batteries store an electrolyte solution in a sealed ampule prior to the firing of the projectile, then release the solution to begin the functioning of the battery in response to some firing signal. A predominant method is to construct the electrolyte ampule so as to release the solution in response to the unique set-back forces experienced when the projectile is fired. One prior art method of achieving this function is to construct the ampule of a frangible material and to support it so that set-back forces will break it. Such ampules are mechanically simple, but the materials chosen for the ampule are not necessarily impervious to the caustic electrolyte solution over long periods. Elements of the electrolyte may escape, hindering later functioning of the battery, or the ampule may weaken, subjecting it to premature breakage.

Another type of set-back operated ampule comprises a metal container which can indefinitely hermetically contain the electrolyte together with a piercing mechanism operated by set-back forces. Such a piercing mechanism generally comprises a mass for responding to set-back forces, a cutter for piercing the metal ampule, and some damping mechanism to prevent electrolyte release in response to forces other than those of set-back, for instance if the projectile is dropped. Ampules of this type are effective. There is a need for a mechanically simpler, yet reliable, electrolyte dispensing ampule for deferred action batteries.

SUMMARY OF THE INVENTION

Accordingly, it is an object of the present invention to provide an improved electrolyte dispensing ampule for deferred action batteries.

It is a further object of the present invention to provide an improved electrolyte dispensing ampule which is set-back responsive, but which does not require a piercing mechanism for operation.

An embodiment of the present invention comprises a spring defining a generally cylindrical interior space, means at each end of the spring for closing the space and means disposed on the spring for sealing together the adjacent turns thereof and for hermetically sealing the electrolyte in the interior space. The means for closing the ends of the spring may be, for instance, a metal cap adapted to fit the end of the spring and to be sealed to it. Such means may also be a continuation of the turns of the springs in a plane generally perpendicular to the axis of the spring. The sealing means is preferably a metal coating applied by electroplating or otherwise. The strength of the coating and the characteristics of the spring control the forces to which the ampule will be responsive and those to which it will not be. In a preferred embodiment of the present invention the thickness of the coating is so small as to provide negligible resistance. Therefore, the responsiveness and drop safety of the ampule are determined entirely by the design of the spring.

A further described embodiment comprises a dispensing ampule of the type described above contained in a deferred action battery. The battery comprises at least one stack of voltage producing plates and a battery case adapted to contain and seal in the ampule and the plates and to support the ampule in such a manner that set-back forces can extend and rupture it.

These and other objects and advantages of the present invention will be apparent to one skilled in the art from the detailed description below taken together with the drawings.

DETAILED DESCRIPTION OF THE INVENTION

Figure 1:
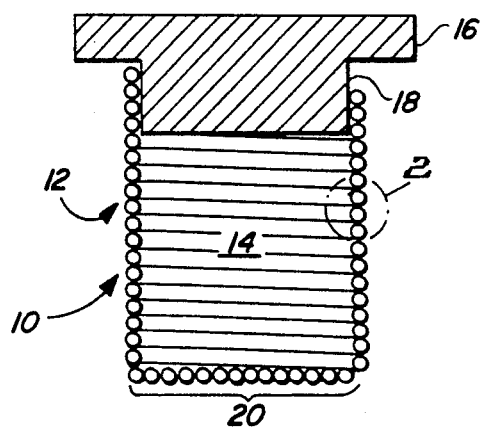
FIG. 1 is a cross-sectional view of a plated spring electrolyte dispensing ampule according to the principles of the present invention.
Figure 2:
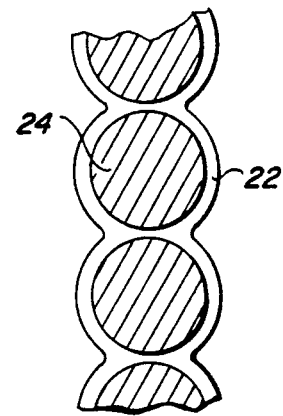
FIG. 2 is an enlarged view of a portion of the plated spring ampule of FIG. 1 as indicated.

Referring now to FIG. 1 and 2 a plated spring electrolyte dispensing ampule 10 according to the present invention is shown and described. A spring 12 forms a generally cylindrical interior space 14. Spring 12 is wound such that adjacent turns thereof are in contact when spring 12 is in an equilibrium position. At a first end of spring 12 a metal cap 16 having a cylindrical protrusion 18 provides a closure for cylindrical space 14. Protrusion 18 is adapted to fit within spring 12 and is affixed thereto, for instance by means of solder or otherwise, so as to provide a seal. At a second end of spring 12, space 14 is closed by means of a plurality of turns 20 of spring 12. Turns 20 lie substantially in a plane perpendicular to the axis of spring 12 and may be formed by familiar techniques employed during the spring winding process. While two particular methods of providing closure for the ends of a space formed by a cylindrical spring are shown here, it is not intended to limit the scope of the present invention to any particular means for performing this function.

In addition to providing closure for the ends of space 14, it is necessary to bond the adjacent turns of spring 12 together in such a manner as to provide a sealed enclosure. A preferred embodiment of the present invention accomplishes this by electroplating a thin layer 22 of metal over adjacent turns 24 of spring 12. It is preferred that layer 22 be of the minimum thickness necessary to provide hermetic sealing, this being on the order of one-quarter to one-half of a mil. Greater thicknesses are certainly usable, but at some point the strength of layer 22 will become a dominant factor in the response of the ampule to set-back forces.

It will be immediately apparent to one skilled in the art that the choice of metals for cap 16, spring 12 and layer 22 is primarily determined by the choice of the electrolyte solution to be used in the battery. The materials must be capable of hermetically containing a highly reactive electrolyte solution, such as fluoboric acid, under time and temperature conditions specified by military requirements. In addition, since the solution to be contained is an electrolyte, no two metals having substantially different oxidation potentials may be in contact with the electrolyte solution. As is well known, beryllium copper will reliably contain acid electrolytes in the absence of air. Other materials such as phosphorus bronze may also be appropriate.

As is well known in the art, besides the ability to hermetically contain the electrolyte over long periods, the primary design criteria for set-back responsive ampules involve the response of the ampule to various forces. The ampule must be able to withstand anticipated forces other than those of set-back, for instance if the projectile is dropped, without releasing the electrolyte. The present invention achieves control over these design criteria by means of the characteristics of spring 12. The motion of a spring with a known spring constant and known mass under the influence of known forces is a familiar problem. Since the anticipated set-back forces and the maximum drop-safety forces for a particular fuze are known in advance, the choice of the proper spring can be readily made by one skilled in the art. While spring 12 as shown here is wound from wire having a cylindrical cross-section other cross-sections, such as elliptical or square, may be used. Such variations may be used to alter the spring constant and/or the characteristics of layer 22. As mentioned above, it is also possible to increase the thickness of metal layer 22 to the point that is becomes a significant factor in the response of the ampule to various forces. A primary advantage of the present invention is that the design of the container itself controls the response of the ampule to set-back forces. Prior art ampules generally involve spring biased and/or viscously damped cutter mechanisms or other mechanical devices to achieve this function.

Figure 3A:
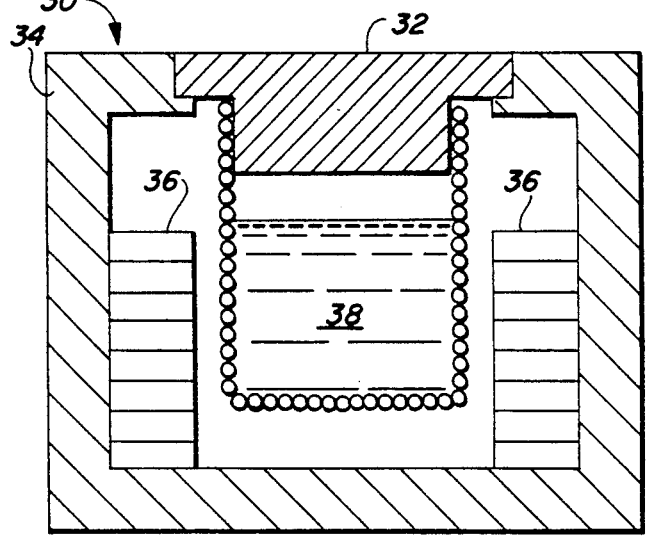
FIG. 3A is a cross-sectional view of a deferred action battery utilizing a plated spring ampule according to the present invention.
Figure 3B:
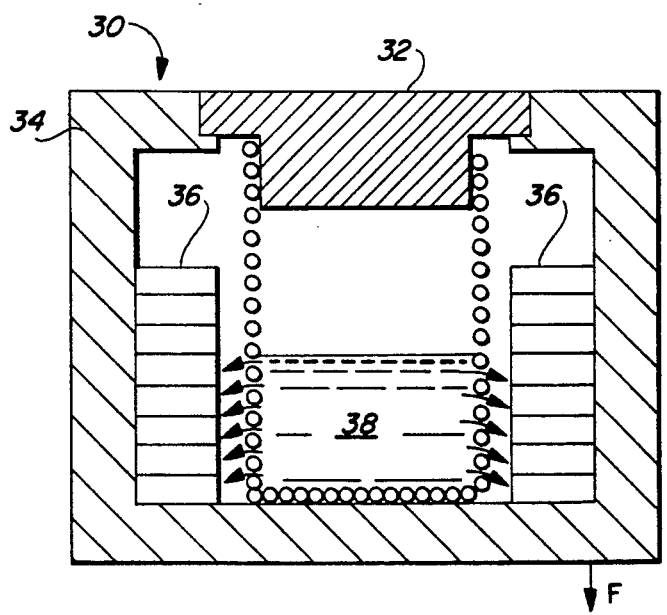
FIG. 3B is a cross-sectional view of the deferred action battery of FIG. 3A as it experiences set-back forces.

Referring now to FIG. 3A a deferred action battery 30 using a plated spring electrolyte dispensing ampule 32 according to the principles of the present invention is shown in cross-section. A battery case 34, which is generally cylindrical, contains an annular ring of battery plates 36. Battery plates 36 generally comprise a plurality of alternating layers of metal and insulating material. In addition, battery case 34 suspends ampule 32 containing electrolyte 38 substantially coaxially with annular battery plates 36 such that the bottom of ampule 32 is suspended above the bottom of battery case 34. A battery 30 of this type is utilized to construct a projectile fuze or the like which may be stored for long periods of time prior to use. Referring now to FIG. 3B the response of deferred action battery 30 to a set-back force F is shown. The mass of the electrolyte solution 38 and of the spring itself accelerates the spring toward the bottom of battery case 34 thus rupturing the thin sealing layer coating the spring and separating the adjacent turns of the spring. Driven by hydrostatic pressure created by set-back force F and by the growing centrifugal force caused by the spinning of the projectile, electrolyte solution 38 dispenses between the now separated turns of the spring and is directed to battery plates 36. The multiple openings available for the dispersal of electrolyte solution 38 will more evenly distribute the solution to the battery plates, thus achieving an improved start-up performance. As set-back force F decreases in magnitude the spring will begin to return to its equilibrium position. By this time, however, the hydrostatic pressure on electrolyte 38 due to the spin forces will be so great as to force electrolyte 38 between adjacent turns of the spring. Thus, it is not anticipated that any latching mechanism will be necessary to hold the spring in its open position. While FIG. 3B shows a plated spring ampule rupturing uniformly over the length of the spring, it will be apparent that this need not be the case. The hydrostatic pressure on the electrolyte solution is such that if only a few turns of the spring actually separate, the electrolyte will be dispensed.

The present invention provides a set-back responsive electrolyte dispensing ampule which can hermetically contain caustic electrolytes over long periods of time and which has an extremely simple mechanical design, thus promising lower fabrication costs in high volume production.

While the invention has been particularly shown and described with reference to a preferred embodiment thereof, it will be understood by those skilled in the art that various other modifications and changes may be made to the present invention from the principles of the invention described above without departing from the spirit and scope thereof.

We claim:

1. An electrolyte dispensing ampule comprising;
    a spring forming a generally cylindrical interior space;
    means at both ends of said spring for closing said cylindrical space; and
    means disposed on said spring for sealing together adjacent turns thereof, said electrolyte being hermetically sealed inside said cylindrical interior space.

2. An electrolyte dispensing ampule comprising:
    a cap having a cylindrical protrusion;
    a spring forming a generally cylindrical interior space, one end of said spring being disposed around and sealed to said cylindrical protrusion of said cap, whereby one end of said cylindrical interior space is closed;
    means disposed at another end of said spring for closing another end of said cylindrical interior space; and
    means disposed on said spring for sealing together adjacent turns thereof, said electrolyte being hermetically sealed inside said cylindrical interior space.

3. An electrolyte dispensing ampule according to claim 2 wherein said means for closing another end of said cylindrical interior space comprises:
    a second cap.

4. An electolyte dispensing ampule according to claim 2 wherein said means for closing another end of said cylindrical interior space comprises:
    a plurality of turns of said spring, said plurality of turns lying substantially in a plane perpendicular to the axis of said spring.

5. An electrolyte dispensing ampule according to claim 1 or claim 2 wherein said means for sealing comprises:
    a layer of metal covering said spring.

6. A deferred action battery comprising:
    an electrolyte dispensing ampule comprising
        a spring forming a generally cylindrical interior space;

means at both ends of said spring for closing said cylindrical space; and means disposed on said spring for sealing together adjacent turns thereof, said electrolyte being substantially hermetically sealed inside said cylindrical interior space;

at least one stack of voltage producing battery plates surrounding said ampule; and case means for containing said ampule and said battery plates.

7. A deferred action battery comprising:

an electrolyte dispensing ampule comprising:

a cap having a cylindrical protrusion;

a spring forming a generally cylindrical interior space, one end of said spring being disposed around and sealed to said cylindrical protrusion of said cap, whereby one end of said cylindrical interior space is closed;

means disposed at another end of said spring for closing another end of said cylindrical interior space; and means disposed on said spring for sealing together adjacent rurns thereof, said electrolyte being substantially hermetically sealed inside said cylindrical interior space;

an annular stack of battery plates disposed around said ampule; and a battery case adapted to contain said battery plates and said ampule and to suspend said ampule above a bottom of said case, whereby set back forces are operative to break said means for sealing and to extend said spring to an open position and centrifugal forces are operative to disperse said electrolyte to said battery plates.

* * * * *